Aug. 5, 1958 H. R. LUTES 2,845,843
STEREOSCOPIC PROJECTOR AND POLARIZING FILTER COMBINATION
Filed May 11, 1955
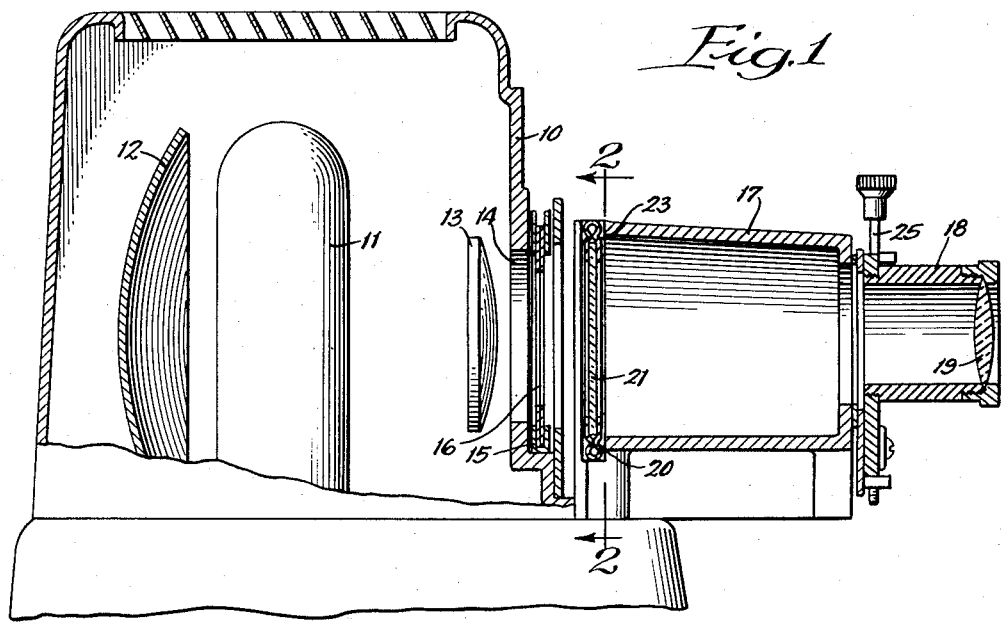
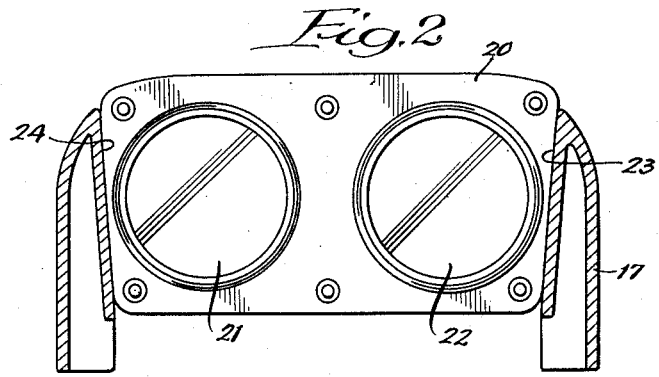
INVENTOR:
Harold R. Lutes,
BY
Dawson, Tilton & Graham,
ATTORNEYS.

United States Patent Office 2,845,843
Patented Aug. 5, 1958

2,845,843
STEREOSCOPIC PROJECTOR AND POLARIZING FILTER COMBINATION

Harold R. Lutes, San Gabriel, Calif., assignor to Compco Corporation, Chicago, Ill., a corporation of Illinois Application May 11, 1955, Serial No. 507,602

2 Claims. (Cl. 88—26)

This invention relates to a stereoscopic projector and polarizing filter combination. The invention will be found to be applicable also to other uses.

The present application is a continuation-in-part of my co-pending application, Serial No. 402,471, filed January 6, 1954, and now abandoned.

In stereoscopic projection, it has been common to mount polarizing filters rigidly or permanently because of the danger of inserting them in the wrong position. Should the polarizing filter be inserted in certain positions, as, for example, upside down, the polarizing effect of the filter is nullified.

An object of the present invention is to provide a structure in which the polarizing filter is removably mounted and is so constructed as to require that it be always inserted in the proper position, the structure further permitting the ready removal of the filter. Another object is to provide a structure utilizing a one-piece or two-piece filter which may be secured in position by any means while providing a tapered filter support which requires proper insertion within the receiving or supporting structure.

The invention is shown, in an illustrative embodiment, by the accompanying drawing, in which—

Figure 1 is a broken sectional view of projector apparatus embodying my invention; and Fig. 2, a sectional detail view, the section being taken as indicated at line 2—2 of Fig. 1.

In the illustration given, a projector is shown provided with a casing 10, which may be of any suitable construction and which includes the usual light source 11 and reflector 12. A pair of lenses 13 may be supported in front of the projector openings 14 of the casing, and the casing is provided with a slot for receiving the film slide holder 15 carrying a pair of transparencies 16.

In front of the transparency 16 is the usual projection chamber or casing 17, provided at its front with rotatable projection tubes 18, each having a lens 19 therein. Means for rotating the tubes 18 are described in detail in my co-pending application, Serial No. 402,471, filed January 6, 1954.

In the practice of the present invention, I provide a filter holder or plate 20 provided with two openings receiving the polarizing filters 21 and 22. The plate 20 is provided with tapered side walls 23 and is adapted to be received within a slot 24 formed within the cylinder 17. The slot 24 is open at its upper end so that the tapered plate 20 can be dropped therein and, by reason of the taper, the plate must be inserted always right side up.

While I have shown the filter holder or plate 20 provided with a pair of filters 21 and 22, it will be understood that the polarizing filter may be formed of a single piece and the holder may be made fixed or removable. If desired, the holder 20 may be inserted through a side slot rather than through the top slot, and instead of being received within a slot, may be secured by screws or any other releasable securing means.

In the operation of the invention, light is projected through the lens 13, the transparencies 16, and thence through the polarizing filters 21 and 22 and through the final lenses 19. Adjustment of the tubes 18 is accomplished through a single operating lever 25. The polarizing filters are placed beyond the films or transparencies 16, and the filter may be removed and replaced as desired. By locating the filters beyond the transparencies, it is found that if the film is of the type that depolarizes light, no harm is done because of the location of the polarizing filters. The full effect of the polarizing filters is felt and there is no tendency for these to be nullified or modified by the use of any film which tends to depolarize light. With the positioning of the polarizing filters in front of the transparencies, it is made certain that the light passing through the transparencies is polarized after it has passed therethrough. Further, with the structure shown, the polarizing filters can be removed and replaced as desired, and correct placing of the filters after removal is insured by the cooperative structure of the filter holder and the slotted walls of the holder or support.

While, in the foregoing specification, I have shown a specific structure in considerable detail for the purpose of illustrating an embodiment of the invention, it will be understood that such details of structure may be varied widely by those skilled in the art without departing from the spirit of my invention.

I claim:

1. In a stereoscopic projector having a housing provided with a pair of horizontally-spaced projection openings and equipped with a light source therein, means provided exteriorly of said housing and in front of said paired openings for removably supporting pairs of film transparencies in alignment with said openings, a projection casing disposed in front of said supporting means and provided at its forward end with a pair of horizontally-spaced lens-equipped projection tubes aligned with the projection openings in said housing, said casing being provided adjacent the rear end thereof and directly in front of said supporting means with a pair of inwardly and downwardly sloping side walls defining a downwardly tapered vertical slot having an opening at the top thereof, and a filter holder plate equipped with a pair of horizontally-spaced apertures having a pair of polarizing filters securely fixed therein, said plate having inwardly and downwardly inclined edges frictionally engaging the inclined side walls of said casing for removably supporting the plate within said slot, whereby, light projected through said film transparencies is polarized by said filters before passing through said lens-providing projection tubes.

2. In a stereoscopic projector, a housing having a pair of horizontally-spaced projection openings therein, a source of light within said housing, a film holder disposed exterior of said housing in front of said openings, a pair of transparency films carried by said holder, a projection casing disposed in front of said holder and provided at its forward end with a pair of horizontally-spaced lens-equipped projection tubes aligned with the openings in said housing, said casing being provided in front of said holder with a pair of inwardly and downwardly sloping side walls defining a downwardly tapered vertical slot having a top access opening, and a filter holder plate having a pair of horizontally-spaced circular apertures and having a pair of circular polarizing filters fixed within said apertures, said plate having downwardly and inwardly inclined lateral edges frictionally engaging the side walls of said casing for removably supporting said plate within said slot and for positioning and maintaining said circular filters in alignment with said tubes and openings, whereby, light projected through said film transparencies is polarized by said circular filters before passing through the lens-providing projection tubes.

References Cited in the file of this patent

UNITED STATES PATENTS

| | | |
|---|---|---|
| 2,270,198 | Schensted | Jan. 13, 1942 |
| 2,612,818 | Jackson | Oct. 9, 1952 |
| 2,764,911 | Smith | Oct. 2, 1956 |

FOREIGN PATENTS

| | | |
|---|---|---|
| 735,238 | Germany | May 10, 1943 |